(12) United States Patent
Donlan

(10) Patent No.: US 9,171,019 B1
(45) Date of Patent: Oct. 27, 2015

(54) DISTRIBUTED LOCK SERVICE WITH EXTERNAL LOCK INFORMATION DATABASE

(71) Applicant: Amazon Technologies, Inc., Reno, NV (US)

(72) Inventor: Bryan James Donlan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 219 days.

(21) Appl. No.: 13/770,569

(22) Filed: Feb. 19, 2013

(51) Int. Cl.
*G06F 17/30* (2006.01)

(52) U.S. Cl.
CPC ................. *G06F 17/30283* (2013.01)

(58) Field of Classification Search
CPC ............. G06F 17/30171; G06F 17/30359
See application file for complete search history.

(56) References Cited

U.S. PATENT DOCUMENTS

| | | | |
|---|---|---|---|
| 4,665,520 A | | 5/1987 | Strom et al. |
| 5,226,159 A | * | 7/1993 | Henson et al. ......... 707/999.008 |
| 5,301,309 A | | 4/1994 | Sugano |
| 6,389,420 B1 | * | 5/2002 | Vahalia et al. ......... 707/999.008 |
| 7,426,653 B2 | | 9/2008 | Hu et al. |
| 7,792,980 B2 | | 9/2010 | Eshel et al. |
| 7,937,616 B2 | | 5/2011 | Armstrong et al. |
| 8,006,124 B2 | | 8/2011 | Park et al. |
| 8,108,712 B1 | | 1/2012 | Carlino et al. |
| 8,108,733 B2 | | 1/2012 | Richmond |
| 2006/0136781 A1 | | 6/2006 | Lamport |
| 2006/0179059 A1 | | 8/2006 | Reed et al. |
| 2007/0174541 A1 | | 7/2007 | Chandrasekaran et al. |
| 2008/0243847 A1 | * | 10/2008 | Rasmussen ....................... 707/8 |
| 2009/0287720 A1 | | 11/2009 | Herter et al. |
| 2009/0327807 A1 | | 12/2009 | Varadarajan et al. |
| 2011/0296069 A1 | * | 12/2011 | Tarta et al. ..................... 710/200 |
| 2012/0310881 A1 | * | 12/2012 | Shadmon ...................... 707/613 |

OTHER PUBLICATIONS

Mike Burrows "The Chubby Lock Service for Loosely-coupled Distributed Systems" OSDI 2006 Proceedings of the 7th symposium on Operating systems design and implementation pp. 335-350.
"Interface Future" Downloaded from docs.oracle.com/javase/1.5.0/docs/api/java/util/concurrent/Future.html on Jun. 20, 2012, pp. 1-4.

(Continued)

*Primary Examiner* — Khanh Pham
(74) *Attorney, Agent, or Firm* — Robert C. Kowert; Meyertons, Hood, Kivlin, Kowert & Goetzel, P.C.

(57) ABSTRACT

A system that implements a distributed lock service may include a failure detector for servers and sessions, and may track the state of sessions on a per-client-connection basis. It may include an external lock information database that stores lock state information and that supports a higher write throughput rate than a distributed state manager. Each database record may store an identifier of a session during which a lock on a respective item was obtained (if any) and a staleness indicator. A distributed state manager may maintain a session identifier and a respective staleness indicator for each established session, and may push updates to this session information to interested client processes, which may cache the information. A client process wishing to lock an item may determine whether it can do so dependent on the information in a corresponding database record and on its own cached session information.

23 Claims, 10 Drawing Sheets

(56) References Cited

OTHER PUBLICATIONS

Arthur P. Goldberg, Ajei Gopal, Andy Lowry, Rob Strom "Restoring Consistent Global States of Distributed Computations" Distributed Systems Software Technology Group, 1991 pp. 144-154.

Oren Laadan, Dan Phung and Jason Nieh "Transparent Checkpoint-Restart of Distributed Applications on Commodity Clusters" Proceedings of the 2005 IEEE International Conference on Cluster Computing (Cluster 2005), Boston, MA, Sep. 26-30, 2005.

Leslie Lamport "Paxos Made Simple" Nov. 1, 2001, pp. 1-14.

Vieira, Gustavo MD, and Luiz E. Buzato. "Distributed checkpointing: Analysis and benchmarks." In Proceedings of the 24th Brazilian Symposium on Computer Networks, SBRC, vol. 6. 2006. pp. 1-16.

Tushar Chandra, Robert Griesemer, Joshua Redstone "Paxos Made Live—An Engineering Perspective" ACM 2007, pp. 1-16.

ZooKeeper: Wait-free coordination for Internet-scale systems Hunt, P.; Konar, M.; Junqueira, F.P.; Reed, B. , USENIX Annual Technology Conference, (2010).

U.S. Appl. No. 13/169,995, filed Jun. 27, 2011, Stefano Stefani et al.
U.S. Appl. No. 13/169,990, filed Jun. 27, 2011, Swaminathan Sivasubramanian et al.
U.S. Appl. No. 13/174,189, filed Jun. 30, 2011, Swaminathan Sivasubramanian et al.
U.S. Appl. No. 13/174,275, filed Jun. 30, 2011, Stefano Stefani et al.
U.S. Appl. No. 13/528,340, filed Jun. 20, 2012, Long X Nguyen.
U.S. Appl. No. 13/528,249, filed Jun. 20, 2012, Long X Nguyen et al.
U.S. Appl. No. 13/528,301, filed Jun. 20, 2012, Long X Nguyen et al.
U.S. Appl. No. 13/528,271, filed Oct. 22, 2012, Long X Nguyen.
U.S. Appl. No. 12/771,840, filed Apr. 30, 2010, Allan H. Vermeulen et al.
U.S. Appl. No. 12/887,042, filed Sep. 21, 2010, Allan H. Vermeulen et al.
U.S. Appl. No. 12/771,851, filed Apr. 30, 2010, Allan H. Vermeulen et al.

\* cited by examiner

DISTRIBUTED LOCK SERVICE WITH EXTERNAL LOCK INFORMATION DATABASE

BACKGROUND

Implementing computing systems that manage large quantities of data and/or service large numbers of users often presents problems of scale. For example, as demand for various types of computing services grows, it may become difficult to service that demand without increasing the available computing resources accordingly. To facilitate scaling in order to meet demand, a particular computing service might be implemented as a distributed application that executes on a number of instances of computing hardware. For example, a number of different software processes executing on different computer systems may operate cooperatively to implement the computing service. When more service capacity is needed, additional hardware or software resources may be deployed.

However, implementing distributed applications may present its own set of challenges. For example, in a geographically distributed system, it is possible that different segments of the system might become communicatively isolated from one another, e.g., due to a failure of network communications between sites. As a consequence, the isolated segments may not be able to coordinate with one another. If care is not taken in such circumstances, inconsistent system behavior might result (e.g., if the isolated segments both attempt to modify data that they would ordinarily coordinate access to). More generally, the larger the distributed system, the more difficult it may be to coordinate the actions of various actors within the system (e.g., owing to the difficulty of ensuring that many different actors that are potentially widely distributed have a consistent view of system state). Depending on the granularity at which state information is shared among different components of distributed systems, the networking and computation overhead associated with sharing state information using traditional techniques such as polling may potentially grow to unsustainable levels.

Distributed lock services may allow workers in a distributed system to stake a claim on a particular job or other lockable item (e.g., a shared data item or other shared resource) for their own exclusive use. However, these distributed systems typically only support a limited degree of write throughput, which may limit their ability to be scaled.

Figure 1:
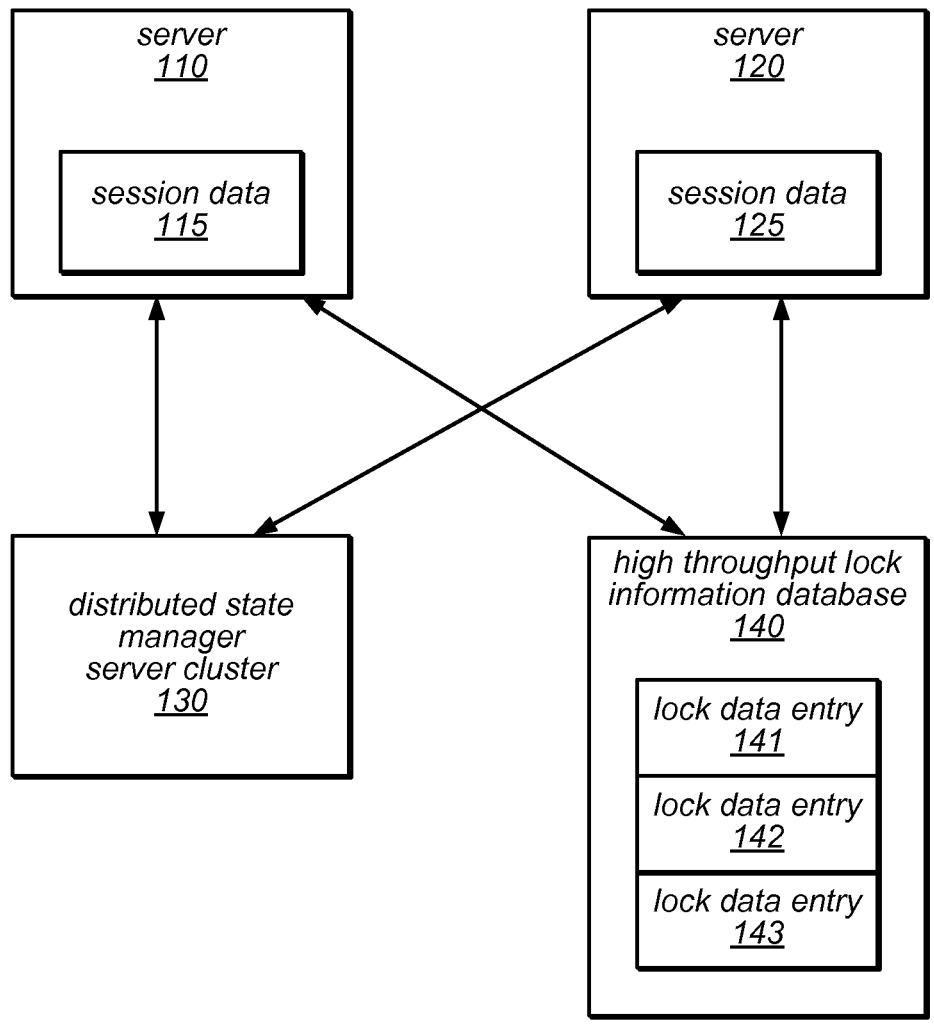
FIG. 1 is a block diagram illustrating various components of a system implementing a distributed lock service that includes a distributed state manager and an external lock information database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The systems described herein may, in some embodiments, implement a distributed lock service that supports higher lock throughput than existing distributed lock services, without sacrificing data integrity. For example, some existing services may only be able to support lock throughput on the order of tens of transactions per second. The systems described herein may include a distributed lock service and an external lock information database, and may be able to lock and unlock items at a much higher rate. In some embodiments, this higher lock throughput may come at the cost of being unable to queue for locks. The systems described herein may use much finer-grained locking than would be possible with existing distributed lock services, and may scale more easily than existing systems. As described in more detail herein, in some embodiments, a distributed state manager may be used to keep track of sessions or licenses (e.g., on a per-client-connection basis), but the locks themselves may be stored in an external database with higher throughput than the distributed state manager.

In general, the systems described herein may include the following components: a number of entities that need to lock an item (or items), a failure detector for each of those entities (e.g., a mechanism that tracks and maintains state information about their sessions and/or underlying computing nodes), and a high throughput database that stores lock state information for each locked (or lockable) item. In some embodiments, the failure detector may know how up-to-date the information it stores for each session based on metadata that indicates the staleness of the information. For example, the failure detector may employ a timestamp value, a transaction count value, or some other type of staleness indicator that is associated with each session and/or may store this metadata along with the identifier of each session. In various embodiments, the locking entities may include client applications or processes (or threads thereof), server applications or processes (or threads thereof), or any computing nodes (or computations executing thereon) that from time to time may need to obtain exclusive use of one or more lockable items. In various embodiments, the lockable items may include, but are not limited to, shared data, shared computing resources, or work items (tasks) that can only be operated on by one worker at a time.

In some embodiments, a distributed state manager (which may be implemented as a cluster of server nodes) may provide failure detection for each of the locking entries (e.g., using a heartbeat mechanism and/or another failure detection mechanism). The distributed state manager may also manage session information for the system. For example, the distributed state manager may maintain information indicating which sessions are active (live), and may provide update notifications to interested locking entities when sessions are created or revoked by various transactions performed by the locking entities or other components in the system. Note that in some embodiments, once a session has been revoked, it cannot be reestablished. In some embodiments, the locking entities may maintain copies of at least some of the session information about sessions in the system in high read throughput memory (e.g., in a session cache), and may also store metadata indicating the staleness of the cached session information. As previously noted, in some embodiments, a high throughput database may store a record that includes lock state information for each item that is locked (or for each item that can be locked) by one of the locking entities. In some embodiments, to obtain a lock on an item, a locking entity may perform an update to a corresponding database record using conditional write to write a session identifier and a timestamp (or another indicator that is subsequently usable to determine the staleness of the session identifier) in the database record.

In one example, the systems described herein may provide a distributed locking service for work items (e.g., lockable data items that represent tasks to be performed by various processes), where the work items can only be worked on by one worker process at a time. In this example, if a worker process wishes to perform one of the tasks, it must first obtain a lock on the corresponding work item. A high throughput lock information database may include an entry (e.g., a database record) for each work item, which may include information about its lock state. In some embodiments, if an item has been locked, the database record for that item may include an identifier of a session during which a locking entity obtained the lock. If the item has not yet been locked, or is not currently locked, there may be no database record for the item, or a session identifier field in the database record for the item may be empty, in different embodiments. In this example, the worker process may query the database to determine whether the target work item has already been locked. If there is no database record for the target work item (e.g., if there is no database record that includes an identifier of the target work item) or if a database record for the target work item does not include a session identifier, the worker thread may proceed to obtain the lock on the target work item (or at least may attempt to do so). In this example, to claim the lock on the target work item, the worker process may update the database record (if one exists) by writing its own session identifier in the session identifier field of the database record, along with a timestamp or another indicator that is subsequently usable to determine the staleness of the session identifier in the database record. If no database record exists for the target work item, the worker process may claim the lock on the target work item by creating a database record for the item that includes an identifier of the target work item, its own session identifier, and a timestamp or another indicator that is subsequently usable to determine the staleness of the session identifier in the database record.

However, if there is a database record for the target work item and that database record includes a session identifier, the worker thread may first need to determine whether the session identified in the database record is live (or is likely to be live) or is known to have been revoked. As described in more detail herein, the worker thread may access cached session information and compare at least some of that information to the information in the database record to determine whether the identified session is live (or likely to be live) or is known to have been revoked.

One embodiment of a system that includes a distributed state manager and an external lock information database is illustrated by the block diagram in FIG. 1. In this example, the system includes two servers on which various entities (e.g., processes or threads) that can lock items are executing (sometimes referred to herein as "compute servers" or "compute nodes"), a distributed state manager server cluster, and a high throughput lock information database (e.g., a database that provides high throughput read and write accesses). In this example, server 110 maintains session data 115, and server 120 maintains session data 125. As illustrated in this example, servers 110 and 120 may in various embodiments maintain the session data in a session information cache or in another memory structure that provides high-throughput read access to the session data. As described in more detail herein, server 110 and server 120 may initiate the creation of sessions corresponding to client connections between the servers and distributed state manager server cluster 130) and/or register new sessions with distributed state manager cluster 130 (e.g., on a client connection basis).

In some embodiments, including in the example system illustrated in FIG. 1, distributed state manager server cluster 130 may set watches (e.g., transactional watches) on some or all of the session data maintained (e.g., cached) on all of the servers on which the various entities that can lock items are executing (e.g., session data 115 and/or session data 125). Note that such watches may be set automatically by the distributed lock service (e.g., when sessions are established) or in response to an explicit request to do so (e.g., from a client), in different embodiments. In response to detecting a transaction that changes any of this session data, distributed state manager server cluster 130 may notify one or more of the servers (e.g., server 110 and/or server 120) of these changes. For example, distributed state manager server cluster 130 may send event notifications to server 110 and/or server 120 indicating which, if any, sessions have been created or revoked in the system.

As illustrated in FIG. 1, the system may include a high throughput lock information database 140 that is external to, and distinct from, distributed state manager server cluster 130 and servers 110 and 120. In some embodiments, the database may guarantee at least atomicity and consistency for transactions that target an entry in the database (i.e., the "A" and "C" of the ACID database properties). As illustrated in this example, the high throughout lock information database 140 may include multiple lock data entries (shown as 141-143). In various embodiments, entries may be created in high throughput lock database 140 for each lockable item in the system upon creation of the lockable items or in response to request to lock them. In some embodiments, each of the lockable items for which entries are stored in high throughput lock information database 140 may be locked by only one executing entity at a time. In other words, only one executing entity at a time may hold a lock on any given lockable item. As noted above, in some embodiments, to obtain a lock on an item, a locking entity may perform an update to a corresponding database record using conditional write to write a session identifier and a timestamp (or another indicator that is subsequently usable to determine the staleness of the session identifier) in the database record. In some embodiments, each session identifier may represent a single connection between a locking entity and the distributed state manager server cluster. Note that in embodiments in which the locking entity comprises multiple processes or threads that interact with the distributed state manager cluster through a single client connection, coordination between those processes or threads may be handled by the locking entity itself without support from or interaction with the distributed state manager cluster.

As described herein, by storing lock state information in an external database (rather than in a distributed state manager) and using a distributed state manager as a watchdog to maintain authoritative information about which servers and/or sessions in the system are live and/or active, the systems described herein may in some embodiments provide distributed lock services with higher lock throughput than existing systems. In some embodiments, using a distributed state manager to maintain session information may allow the system to take advantage of the following property of the distributed state manager: sessions that have been revoked cannot be reestablished, therefore prevent the possibility of observing an inconsistent view of the session information maintained by the distributed state manager. In addition, the distributed state manager may be configured to deal with the subtleties of clock skew in the system (e.g., in its heartbeating mechanism) in such a way that it may serve as an authoritative source of information indicating which servers and/or sessions are live (active) before the other components are aware of any changes to this information. The distributed state manager may also provide a convenient way to broadcast session state all of the client processes to let them know which servers and sessions are alive (e.g., through a transactional watch mechanism).

As noted above, in some embodiments, a locking entity that wishes to obtain a lock on an item, it needs to determine whether the lock is already being held (e.g., by another locking entity), and this determination may be dependent on one or more of: a session identifier in a corresponding record in the locking information database (e.g., a record that includes an identifier of the item), staleness information in the corresponding record in the locking information database, or session information (including session identifiers and/or staleness indicator values) that is maintained by the distributed state manager and cached by the locking entity (and/or other locking entities). For example, if a locking entity wishes to lock an item, it may attempt to write its session identifier (which may be a numeric value or a string, in different embodiments) and a staleness indicator (e.g., a timestamp value or a transaction identifier) into a database record for the item. In this example, if the locking entity observes that the database record already includes a session identifier, the locking entity knows that the item was locked at some point in the past. Therefore, the locking entity needs to determine whether the session identified in the database record is still live/active (and, thus, whether the lock still valid). For example, if the server for the identified session failed at some point (causing the session to be revoked and the lock to be invalid), there may still be a record in the database table for that item and its lock even though the lock is no longer valid. In this example, the distributed state manager may maintain information indicating with sessions are live (e.g., a list of all valid sessions and their session identifiers) and may provide at least some of that information to the locking entity, which may cache it. In this example, the locking entity may consult its cached session information to determine if it thinks the session identified in the database record is live. If the session identifier for the identified session is found in its session cache, the locking entity may assume that the session is still live and may abandon its attempt to obtain the lock.

However, if the session identifier for the identified session is not found in its session cache, the locking entity may not assume that the identified session is not live. For example, if the session cache is out-of-date, the locking entity may think the identified session does not exist or has already been revoked, when in reality the session may have been recently created and the session cache has not yet received information about it from the distributed state manager. As noted above, in some embodiments, a staleness indicator (which may indicate the time, or relative time, at which the session was created) may be stored in the database record for the lock/item. When the locking entity does not find a session identifier for the identified session in its session cache, it may compare the staleness indicator in the database record with the last transaction seen by the session cache (e.g., the staleness indicator for the session identifier that was most recently updated (added) in the session cache. In other words, it may determine the point at which the session cache information was most recently known to be valid. If the staleness indicator in the database record is newer than the most up-to-date session information in the session cache, the locking entity may assume that the session identified in the database record is live (active) and that the lock on the item is valid. Note that in the case that the identified session was recently created, the session cache will eventually be updated by the distributed state manager to include the session identifier and staleness indicator for the identified session (e.g., within a few seconds, in some embodiments).

Figure 2:
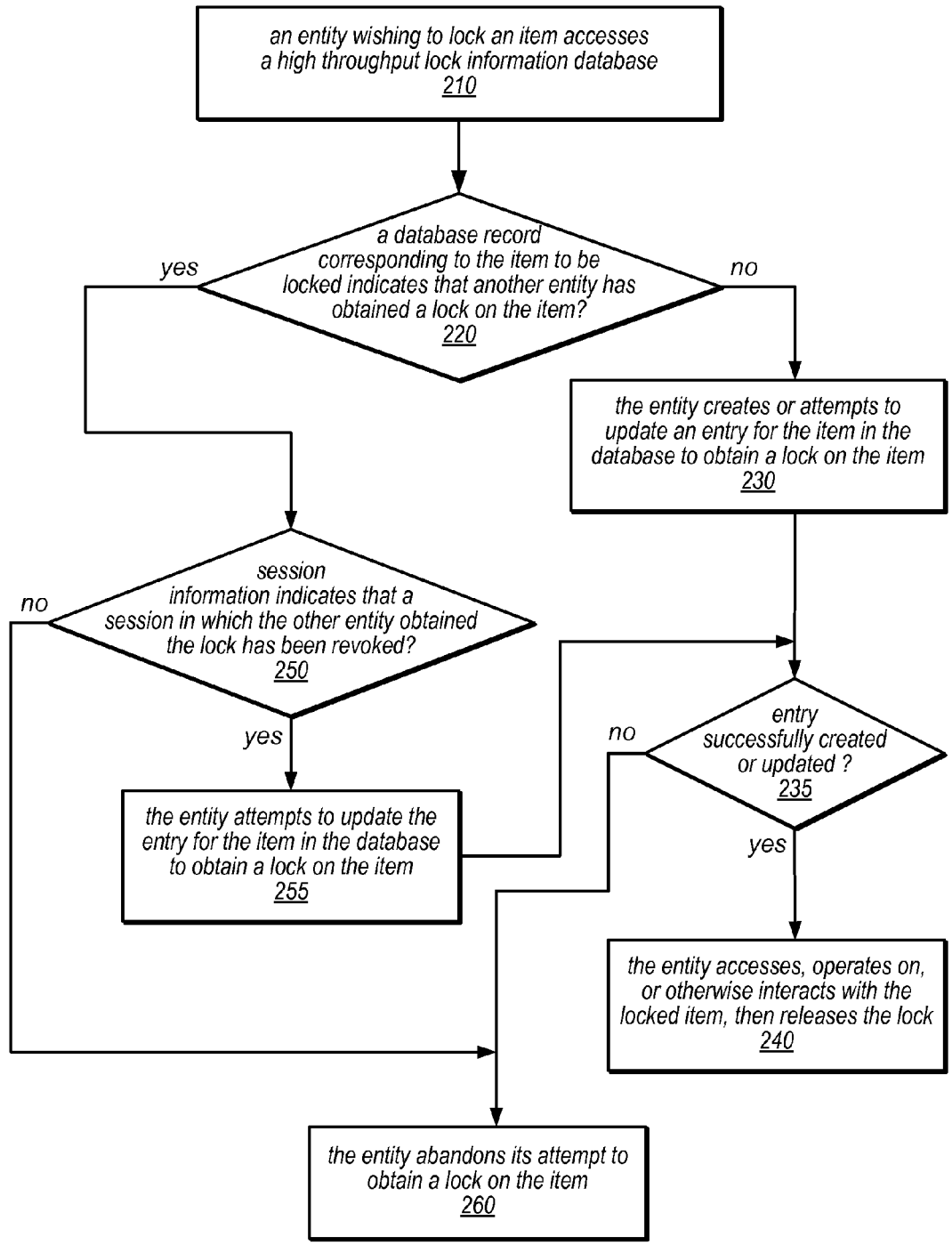
FIG. 2 is a flow diagram illustrating one embodiment of a method for obtaining a lock on an item.

One embodiment of a method for obtaining a lock on an item is illustrated by the flow diagram in FIG. 2. As illustrated in this example, the method may include an entity that wishes to lock an item accessing a high throughput lock information database (e.g., one that is separate and distinct from a distributed state manager component of the system) to retrieve or examine at least a portion of the locking information stored in the database, as in 210. In some embodiments, the entity wishing to obtain a lock may be a process or thread executing in a session (where a session is defined by a connection between a locking entity and the distributed state manager). As illustrated in this example, if there is not a database record corresponding to the item to be locked indicating that another entity has obtained a lock on the item (shown as the negative exit from 220), the method may include the entity creating or attempting to update an entry (e.g., a database record) for the item in the database in order to obtain a lock on the item, as in 230. For example, if there is no entry (record) in the database corresponding to the item to be locked, the entity may create one. In some embodiments, the entity may write its own session information into a session ID field of the entry (record) when creating the entry (record) in order to obtain a lock on the corresponding item. In other embodiments, an operation to update the entry (record) may be performed separately from (and subsequent to) an operation to create the entry (record) for the item to be locked.

In another example, if there is an entry (record) in the database corresponding to the item to be locked, but the session ID field of that entry is empty (e.g., if it stores a value of zero) or if the session ID field of that entry stores another value indicating that no entity currently holds the lock on the item, the entity may write its session information into the session ID field of the entry (record) to obtain the lock on the item. In some embodiments, the entity may use an atomic compare-and-swap (CAS) type operation to attempt to update the value of the session ID field of the entry to ensure that another entity has not obtained the lock between the time the entity accessed the session ID field to read its value and the time the entity accessed the session ID field to update its value. As illustrated in FIG. 2, if the entry for the item to be locked is successfully created or updated by the entity (shown as the positive exit from 235), the method may include the entity accessing, operating on, and/or otherwise interacting with the locked item, and then releasing the lock, as in 240. For example, in various embodiments, releasing the lock may include deleting the corresponding entry in the database or clearing the value of the session ID field of the entry.

As illustrated in this example, if the attempt to update the entry corresponding to the item to be locked is not successful (shown as the negative exit from 235), the method may include the entity abandoning its attempt to obtain a lock on the item, as in 260. In other words, in some embodiments, the entity may not bother checking to see which (if any) other entity obtained the lock, or determining why the attempt to update the entry failed, but instead may merely assume that the lock is no longer available (i.e., that it is already held). In some embodiments, the locking entity may retry its attempt to obtain the lock later (not shown), repeating all of the operations illustrated in FIG. 2 in a subsequent (separate and distinct) attempt to obtain the lock. In some embodiments, the system may not support queuing for a lock, but a locking entity may be configured to poll on a database entry until it observes that the session ID field is clear. In some embodiments, in response to a failure to update the database record to obtain the lock, the locking entity may repeat the entire method illustrated in FIG. 2 in case the server has died or the session was revoked at some point (in which case the session information maintained by the distributed state manager and/or the database entry for the lock have not yet been updated, but may be updated prior to the repeated attempt to obtain the lock).

As illustrated in this example, if an entry (database record) corresponding to the item to be locked indicates that another entity has already obtained a lock on the item (shown as the positive exit from 220), the method may include determining whether the session during which the lock was obtained is still live or has been revoked. For example, the method may include determining whether session information to which the entity has access (e.g., session information cached or otherwise stored by a server on which the entity is executing) indicates that the session in which the other entity obtained the lock has since been revoked, as in 250. If so, shown as the positive exit from 250, the method may include the entity attempting to update the entry (record) for the item in the database to obtain a lock on the item, as in 255. As previously noted, in some embodiments, the entity may use a CAS type operation to attempt to update the value of the session ID field of the entry to ensure that another entity has not obtained the lock between the time the entity accessed the session ID field to read its value and the time the entity accessed the session ID field to update its value. Here again, if the attempt to update the entry is successful (shown as positive exit from 235), the method may include the entity accessing, operating on, and/or otherwise interacting with the locked item, and then releasing the lock, as in 240.

As illustrated in this example, if session information to which the entity has access (e.g., session information cached or otherwise stored by a server on which the entity is executing) does not indicate that the session in which the other entity obtained the lock has since been revoked (e.g., if the session information indicates that the identified session is still live or if it is unknown whether it is still live), shown as the negative exit from 250, the method may include the entity assuming that the session is still live, and abandoning its attempt to obtain a lock on the item, as in 260.

As previously noted, in some embodiments, when updating a database record to perform a locking operation, the locking entity may perform the update using a conditional write operation. For example, once the locking entity determines that the lock is not being held and initiates an attempt to update the corresponding database record, the locking entity may invoke an atomic transaction that reads the values in the session ID field and the staleness indicator field and writes new values to these fields, and the transaction may only be committed (and the update may only take effect) if no other entity has written different values to these fields since they were read by the transaction. In other embodiments, one or more fields of the database record may be updated using an atomic CAS type operation. For example, the locking entity may use a CAS type operation to attempt to update the session ID field, and if it is successful, the locking entity may update the staleness indicator field (with or without using a CAS type operation) accordingly. These or similar mechanisms for performing atomic updates may allow the locking entity to verify that the values of the session ID field and the staleness indicator field are not changed between the time at which the locking entity reads the values of these fields and the time at which it writes new values to these fields. If an attempt to update the database record fails (e.g., if a CAS type operation fails or an atomic transaction to update the database record fails to commit), the locking entity may assume that the lock was obtained by another entity and is no longer available.

Figure 3:
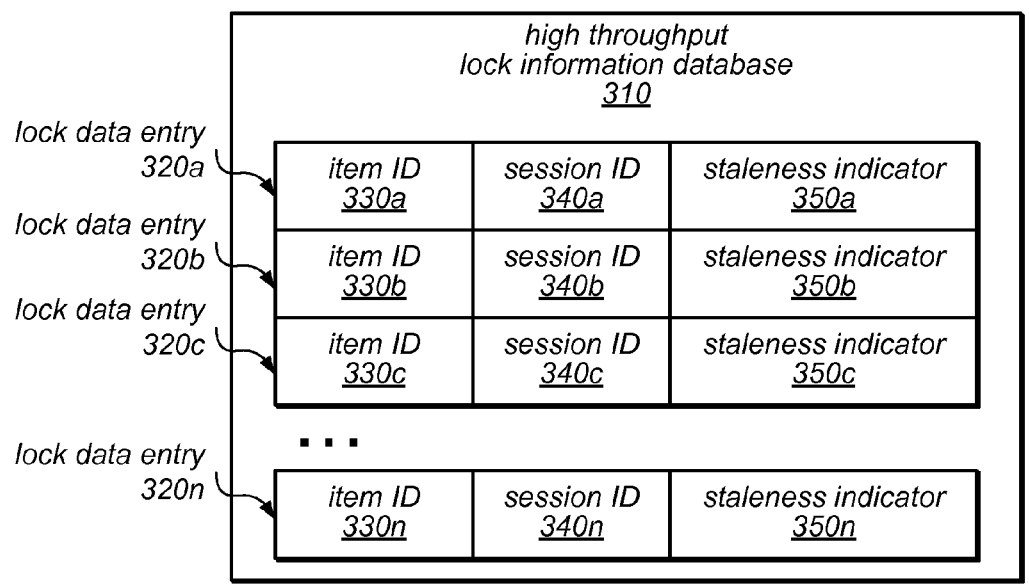
FIG. 3 is a block diagram illustrating one embodiment of a high throughput lock information database.

One embodiment of an external database (or a database table thereof) that stores lock information on behalf of a distributed state manager (e.g., a distributed lock manager) is illustrated by the block diagram in FIG. 3. In this example, high throughput lock information database 310 includes multiple records that store lock information. These are illustrated in FIG. 3 as lock data entries 320a-320n. Each of the lock data entries 320 is configured to store lock information for a respective lockable item (e.g., a shared data element or block, another type of shared resource, a work item, etc.). In this example, each of the lock data entries 320 includes an item identifier (item ID 330), which identifies the lockable item for which information is stored in the entry. In some embodiments, the value of the item ID field in each entry may serve as an index into the database to locate lock information for the corresponding lockable item. In different embodiments, the lock data entries for each lockable item may be created in the database table when the lockable item is created, when a lock is requested for the lockable item, or at another time. As illustrated in this example, each lock data entry may include a session identifier (session ID 340) whose value (if not empty) identifies the session in which the lock on the corresponding lockable item was most recently obtained. In some embodiments, the lockable item itself may be stored in the lock data entry that stores its lock state information (not shown). For example, in different embodiments, each of the lock data entries 320 may include a field in which item data for a lockable data item, item data for a lockable work item, or item data for a pointer to or another representation of a lockable item may be stored along with its lock state information.

In this example, each lock data entry also includes an indicator that can be used to determine the staleness (or relative staleness) of the information in the entry (staleness indicator 350). In various embodiments, this staleness indicator may represent a timestamp (e.g., reflecting the time at which the session was created, the time at which the lock data entry was created or updated, or the time at which its creation or an update was requested or initiated), a transaction ID (e.g., identifying the particular transaction that resulted in creating the session or the particular transaction that resulted in creating or updating the lock data entry), or another type of staleness indicator that can be used to determine whether a session is known to be dead. In general, the staleness indicator may represent anything whose value that increases over time (e.g., that "counts up") so that different staleness indicator values may be used to determine the relative times at which various transactions were performed and/or various events took place. The use of this information in managing locks is described in more detail herein, according to various embodiments. Note that in various embodiments, a database (or database table) that stores the lock information described herein may or may not store other information used by a distributed locking service or for other purposes.

As previously noted, one or more locking entities on various compute nodes in the system (e.g., client processes that have established a connection with the distributed state manager) may cache information about the state of some or all existing sessions. In some such embodiments, such client-side caching may be performed automatically in response to establishing a connection (which defines a session) with the distributed state manager. In some embodiments, the distributed state manager may be configured to send update notifications to some or all of the locking entities when any (or particular elements of) the session information it maintains changes, and the locking entities receiving the update notifications may update their copies of the session information (e.g., in their caches). As described herein, staleness indicators that are included in the session information along with identifiers of each live (active) session may be used to distinguish between unknown sessions that have already been revoked and those that have not yet been observed by various locking entities.

As previously noted, in some embodiments, each session may correspond with (or be defined by) a single client connection (e.g., a connection between a locking entity and the distributed state manager). For example, if there is one client connection per process and process per compute server (e.g., per compute node), there may be only one session per compute server. In other embodiments, there may be more than one connection opened per process or per server, each of which may define a different session. However, in general, it may be preferable not to open too many connections per computer server to avoid overloading the distributed state manager cluster. In some embodiments, several worker threads on a compute node may be associated with each session. For example, there may be multiple threads working on a task within a single session. In such embodiments, coordination between those threads may be handled internally at the compute node (client). In this example, to other locking entities (and from the perspective of the lock for the corresponding work item), it may look like one entity (the session) holds the lock and is working on the item. However, this entity may be using multiple threads to work on the item or may even be a cluster itself.

Figure 4:
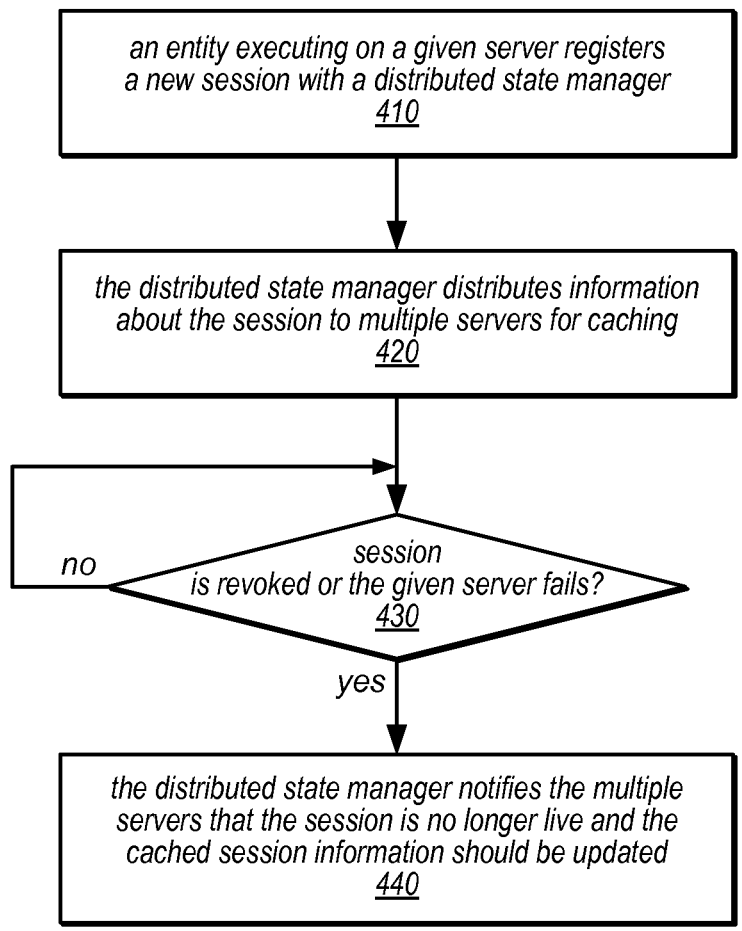
FIG. 4 is a flow diagram illustrating one embodiment of a method for managing session information.

One embodiment of a method for managing session information is illustrated by the flow diagram in FIG. 4. As illustrated in this example, the method may include an entity executing on a given server registering a new session with a distributed state manager, as in 410. For example, in some embodiments, the new session may correspond to the creation of a connection between a client process (or a thread thereof) and the distributed state manager. As described above, in some embodiments, a cluster of server nodes may be configured to implement the distributed state manager. The method may also include the distributed state manager distributing information about the new session to multiple servers on which clients, processes, or threads thereof that have access to items to be locked are executing, and each of those servers may cache (or otherwise store) the information locally, as in 420. For example, the distributed state manager may send an update notification to various locking entities (e.g., various compute servers, which may include the server that registered the new session) that includes a session ID for the new session to be added to a list of live sessions that is cached (or stored in another high read throughput memory structure) by the locking entities. In some embodiments, the update notification may also include a staleness indicator value for the new session (which may indicate a time or a relative time at which the session was created or requested to be created).

As illustrated in this example, if the session is subsequently revoked or the given server fails (shown as the positive exit from 430), the method may include the distributed state manager notifying the multiple compute servers to which the session information was distributed that the session is no longer live and the corresponding cached (or otherwise locally stored) session information should be updated, as in 440. In some embodiments, in response to the notification, the compute servers may delete the session ID from the cache (or other local memory structure) or may otherwise mark the session ID information as being revoked or invalid. Note that more detailed examples of such event notifications and failure detection are described herein, according to various embodiments.

As previously described, if a locking entity (e.g., a client process, worker thread, etc.) wants to lock an item, but observes that a session ID value is already written in a corresponding record in a lock information database, prior to attempting to obtain the lock, the locking entity may need to determine whether the identified session is still live (active) and, therefore, whether the lock is valid. If the locking entity has the session ID value that was observed in the database record in their cache, it may assume that the session is live (active) and the lock is valid. If not, the locking entity may need to check the staleness indicator in the database record to determine whether the list of live sessions that they have cached (or otherwise stored) locally is up-to-date at least to the point in time that the identified session was created (as indicated by the staleness indicator in the database record). If so, the locking entity may assume that it would have observed (and stored) information about the identified session if it had already been created. If the locally cached (stored) session information is not up-to-date to that point in time, the locking entity may assume that the session is likely to still be live/active and the lock valid (e.g., it may assume that the session ID corresponds to a session that was recently created, but for which information has not yet been distributed to the locking entity and/or stored locally). In this case, rather than attempting to accelerate an update of the locally cached (stored) session information, the locking entity may assume that the distributed state manager will eventually push the new session information (if, indeed the session is a newly created one) to the locking entity, at which point it will update its locally cached (stored) session information. If the locking entity initiates a subsequent attempt to obtain the lock (following an update of its locally cached session information), it may be able to determine whether the identified session was, in fact, a newly created session or is a session that was created and then revoked at some time in the past. As previously noted, the distributed lock service (and underlying system) described herein may not support queuing for locks. Therefore, in various embodiments, in response to not being able to determine whether a session ID observed in a lock data entry for an item that a locking entity wishes to lock corresponds to a live session, the locking entity may be configured to poll on the lock data entry periodically and/or to perform other work and then (optionally) re-initiating an attempt to obtain the lock at a later time.

Figure 5:
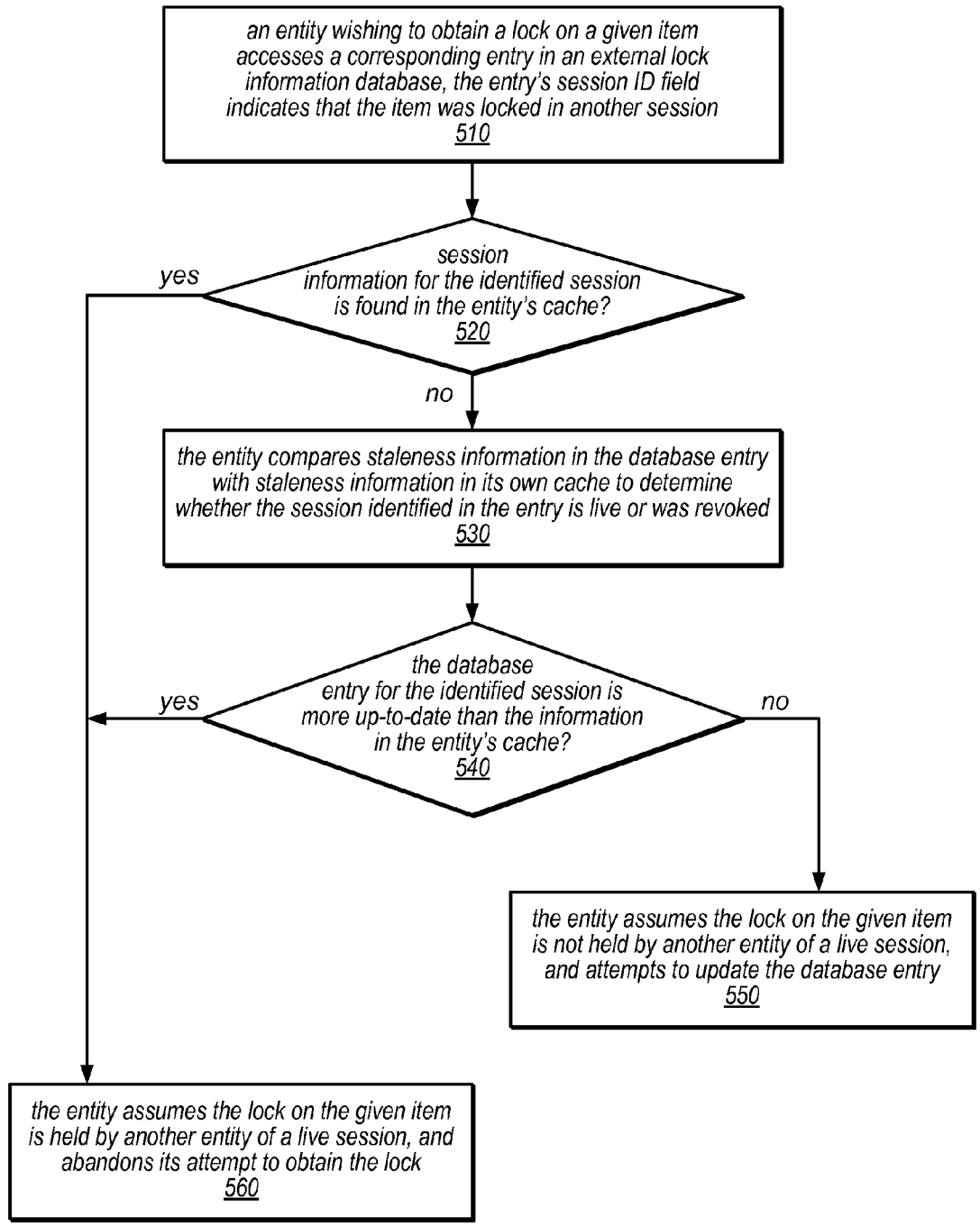
FIG. 5 is a flow diagram illustrating one embodiment of a method for determining whether a lock on an item is held by another entity in a live session.

One embodiment of a method for determining whether a lock on an item is held by another entity in a live session is illustrated by the flow diagram in FIG. 5. As illustrated in this example, the method may include an entity wishing to obtain a lock on a given item accessing a corresponding entry in an external lock information database, and determining that the value of the session ID field of that entry indicates that the item was locked during a session identified by that value, as in 510. The method may include the entity determining whether session information for the session identified by the value of the session ID of the database entry is found in the cache on the server on which the entity is executing, as in 520. If so (shown as the positive exit from 520), the entity may assume the lock on the given item is held by an entity of a live session, and the method may include the entity abandoning its attempt to obtain the lock, as in 560.

As illustrated in FIG. 5, if the session information for the session identified by the value of the session ID of the database entry is not found in the cache on the server on which the entity is executing (shown as the negative exit from 520), the method may include the entity comparing staleness information in the database entry with staleness information in its own cache to determine whether the session identified in the entry is (or is likely to be) live or is known to have been revoked, as in 530. For example, the locking entity may compare the value of one or more timestamps (of cached session information), transaction IDs (of cached session information), or other indicators of how recently the cached session information was updated with a similar indicator in the lock information database entry to determine whether the cached session information is up-to-date, as described above. In this example, if the database entry for the identified session is more up-to-date than the information in the entity's cache (shown as the positive exit from 540), the entity may assume that the lock on the given item is held by an entity of a live session, and the method may include the entity abandoning its attempt to obtain the lock, as in 560. However, if the database entry for the identified session is not more up-to-date than the information in the entity's cache (shown as the negative exit from 540), the entity may assume that the lock on the given item is not currently held by an entity of a live session, and the method may include the entity attempting to update the database entry (to obtain the lock), as in 550. As in previous example, the locking entity may attempt to update the database entry using one or more CAS type operations or an atomic transaction.

Note that in some embodiments, the session ID observed by a locking entity may indicate that the lock was already obtained in the same session (e.g., by the same process or thread that created the connection). In this case, the locking entity may abandon its attempt to obtain the lock (since its session already holds the lock), after which it may or may not be able to access or use the lockable item. For example, if the lock is held by a thread of a locking entity (or session) in which multiple processes or worker threads are employed to perform tasks, the coordination between those processes or worker threads with respect to lockable items may be handled on the server on which the locking entity (or session) is hosted, rather than by the distributed locking service (and/or the underlying system) described herein.

In some embodiments, locks obtained in the manner described herein may be held indefinitely by the locking entities that obtain them. For example, they may be held until the process terminates or the session during which they were obtained is revoked. In other embodiments, when a locking entity (e.g., a process or worker thread) is finished with a lock (e.g., when it no longer needs to access, operate on, or otherwise interact with the item protected by the lock), it may release the lock. Example methods for releasing a lock are illustrated in FIG. 6 and FIG. 7 and described below.

Figure 6:
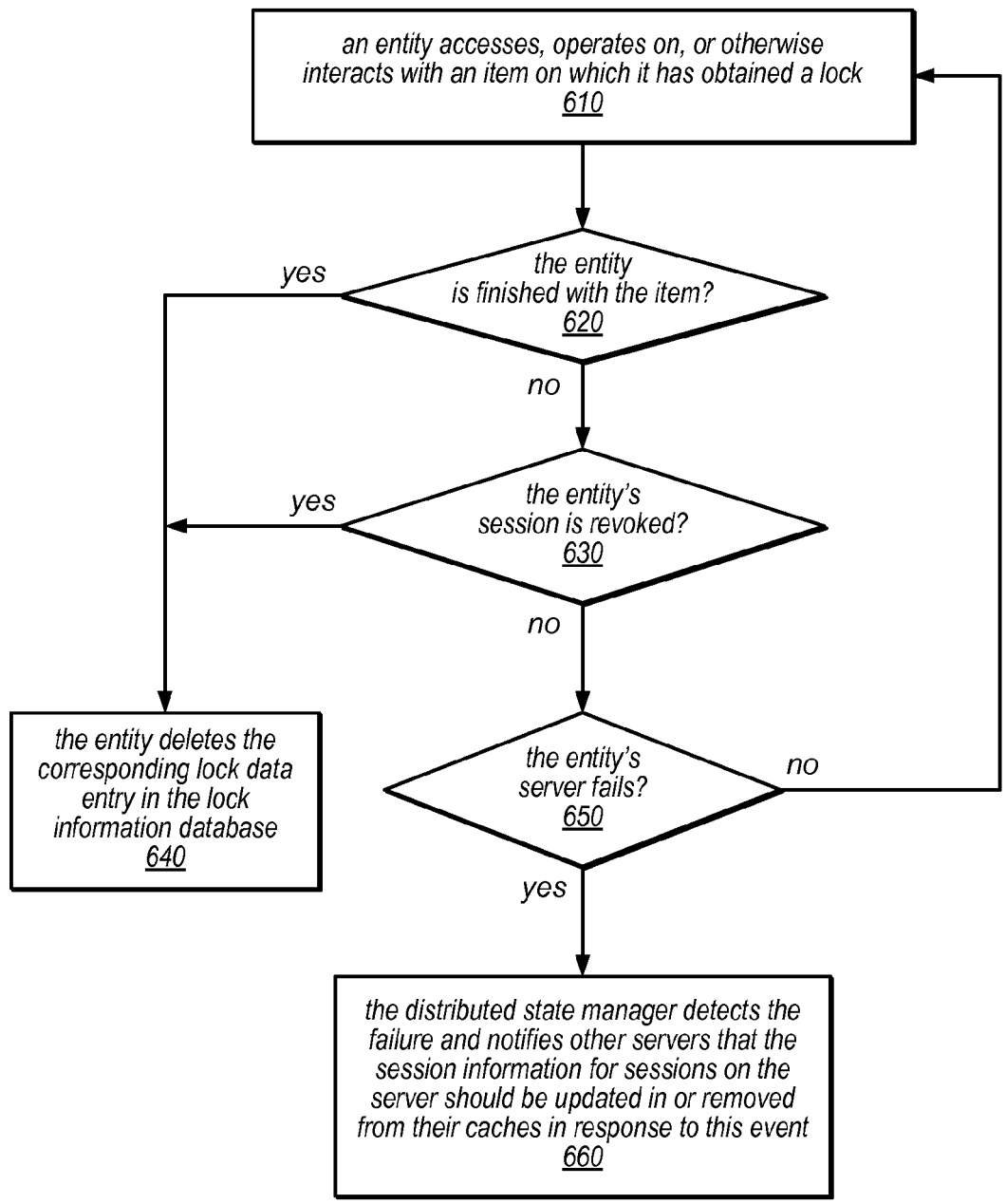
FIG. 6 is a flow diagram illustrating one embodiment of a method for releasing a lock on an item.
Figure 7:
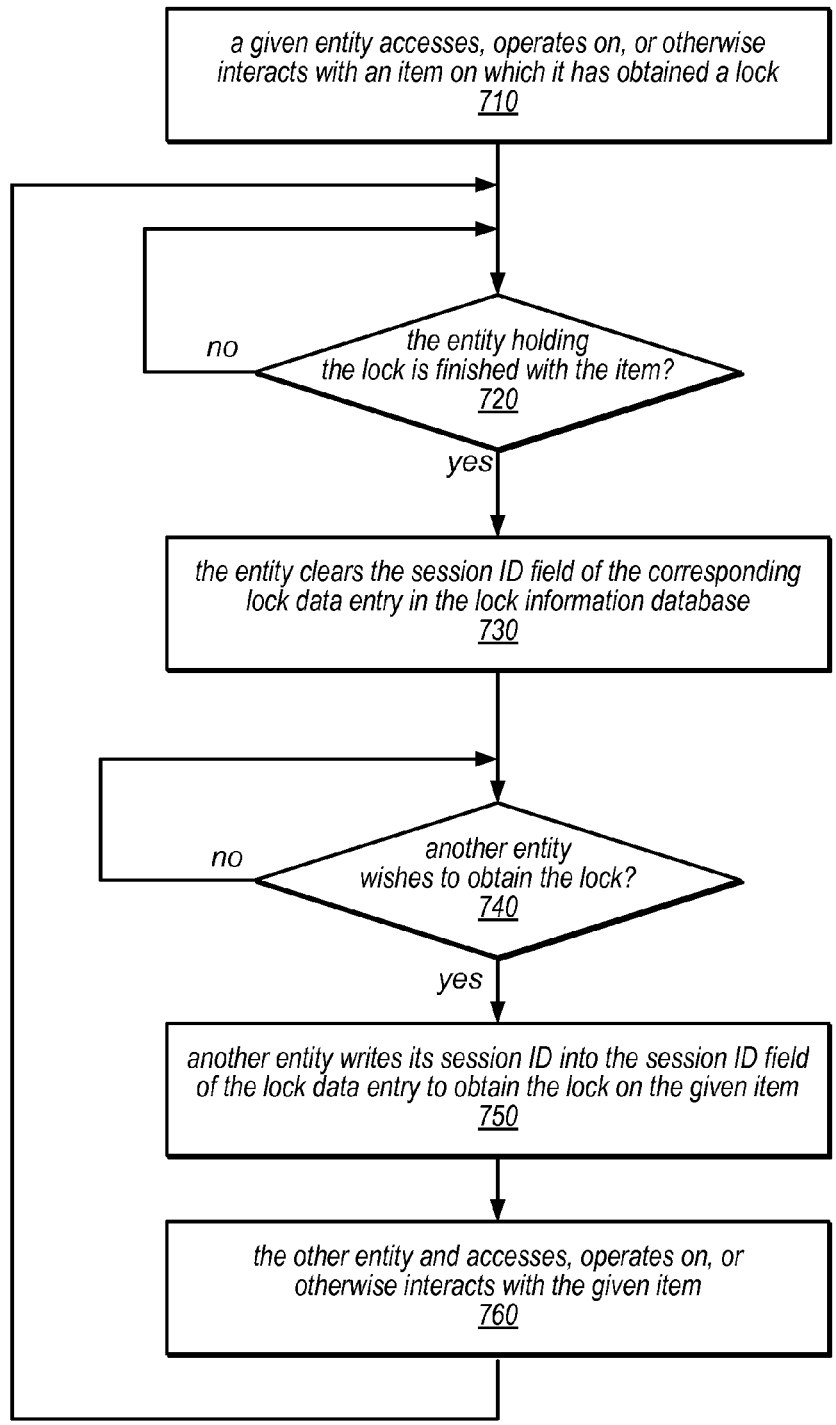
FIG. 7 is a flow diagram illustrating one embodiment of a method for releasing a lock on a lockable item in a system in which multiple entities may access the item in series.

One embodiment of a method for releasing a lock on an item is illustrated by the flow diagram in FIG. 6. As illustrated in this example, the method may include an entity accessing, operating on, or otherwise interacting with an item on which it has obtained a lock, as in 610. As previously noted, the item may be a shared data item or other shared resource, a work item, etc., in different embodiments. In some embodiments, the entity may retain the lock as long as it is using the locked item, until the server on which the entity is executing fails and/or until the entity's current session (i.e., the session during which the lock was obtained) is revoked. This is illustrated in FIG. 6 by the feedback from the negative exit of 650 to 610. As illustrated in FIG. 6, once the entity is finished with the locked item (shown as the positive exit from 620), the method may include the entity deleting the lock data entry in the lock information database that corresponds to the locked item, as in 640. Similarly, if the session during which the lock was obtained is revoked (e.g., if the entity that obtained the lock and currently holds it breaks its connection with the distributed state manager or otherwise ends its session), the method may include the entity deleting the lock data entry in the lock information database that corresponds to the locked item, as in 640. Note that in both of these cases, there may be no need for the distributed state manager to detect that the lock data entry was removed or to notify other servers that any cached session information should be updated. This is because if the lock data entry is removed from the database, a locking entity that subsequently desires to obtain a lock on the item will not find an entry corresponding to the item in the database, and will not need to check the cached session information to determine whether it can attempt to obtain the lock.

In some embodiments, the distributed state manager may be configured to detect the failure of the server and/or the revocation of the session, and to notify one or more other servers that they should update their cached session information. As illustrated in this example, if the server on which the entity that currently holds the lock fails (shown as the positive exit from 630), the method may include the distributed state manager detecting the failure and notifying other servers that the session information for sessions on the failed server should be updated in or removed from their caches in response to this event, as in 660. In some embodiments, updating these caches may allow the lock data entry for the locked item to be updated by another entity that subsequently attempts to obtain the lock, since the other entities will be able to determine that the previous entity's session is no longer live.

In one embodiment, a client application or other entity may process work items from a queue of work, each of which can only be operated on by one computing node at a time. In this example, the application may which to lock each of the work items when it is being worked on, and a traditional distributed state manager (e.g., a traditional distributed lock manager) may not be able to keep up with the throughput necessary to lock and unlock all of the work items as the client application executes. However, in the systems described herein, an external database with a higher write throughput than a distributed state manager may serve as the arbiter for obtaining and releasing locks on the work items, while the distributed state manager may manage session information and provide failure detection (which may not require such high throughput). In some embodiments, work items (or other lockable items) may not be persistent. In other words, an item that is locked by one locking entity may not be subsequently locked by another entity once the lock is released (and in fact, the item itself may cease to exist at this point). However, in other embodiments, one worker process (or thread) may obtain a lock on a work item, may perform some amount of work on the corresponding task(s), and may release the lock, after which another worker may obtain the lock and continue working on the remaining task(s) associated with the work item. Note, however, that they system may not support queuing for the lock. Instead, a worker may poll on a database record corresponding to a work item until it is available, or may scan a database table in order to identify work items that are available for it to work on.

One embodiment of a method for releasing a lock on a lockable item in a system in which a series of entities may access the item (one after the other) is illustrated by the flow diagram in FIG. 7. As illustrated in this example, the method may include a given entity accessing, operating on, or otherwise interacting with an item on which it has obtained a lock, as in 710. As previously noted, the item may be a shared data item or other shared resource, a work item, etc., in different embodiments. As previously noted, in some embodiments, an entity holding a lock on a lockable item may retain the lock indefinitely (or until server fails and/or session is revoked). This is illustrated in FIG. 7 by the feedback from the negative exit of 720 back to 720. Once the entity holding the lock is finished with the item (or otherwise no longer desires to hold the lock), shown as the positive exit from 720, the method may include the entity clearing the session ID field of the corresponding lock data entry in the lock information database, as in 730.

In this example, until or unless another entity wishes to obtain the lock (which is shown as the positive exit from 740), the lock may remains unheld until or unless another entity picks it up (e.g., the session ID field of the entry may remain empty until or unless some other entity writes its session ID into that field or explicitly deletes the entry). If another entity wishes to obtain the lock (shown as the positive exit from 740), the method may include the other entity writing its session ID into the session ID field of the lock data entry in order to obtain the lock on the given item (as in 750) and the other entity accessing, operating on, or otherwise interacting with the given item (as in 760). For example, different workers may to continue work on a work item, to access a shared resource in series. In this example, the operations illustrated in FIG. 7 may then be repeated from the perspective of the new lock holder, shown as feedback from 760 to 720). Although not illustrated in FIG. 7, if the session for a worker that is performing tasks on behalf of a locked work item is revoked or the server on which the worker is executing fails, a failure detecting component (e.g., a distributed state manager) may detect this condition and may cause the session information cached by one or more other workers to eventually be updated, thus allowing another worker to obtain the lock and perform any remaining work following the revocation or failure.

For some types of distributed applications such as those described herein, it may be useful for the constituent processes of the applications to keep track of updates to portions of the application state information maintained in the registry. For example, for a distributed storage service, the registry may include mappings between storage object names and the storage devices on which the objects' data is located, and the mappings may change as data is modified by users of the distributed storage service, as storage devices fill up or are reorganized over time. In another example, in the distributed lock systems described herein, it may be useful to keep track of which sessions that may have obtained locks on lockable items are still live (i.e., active) and which have been revoked. In order to retrieve data from (or store data to) the right storage device, a client process implementing a portion of the distributed storage service may need the most recent set of mappings. A number of different approaches may be taken to keep the client processes up to date regarding registry updates. In some systems, client processes may be responsible for polling a distributed state manager (DSM) to retrieve the latest version of the registry contents. However, polling-based approaches may not be very efficient, either computationally or in terms of the network traffic that may be generated. Accordingly, in some embodiments, a DSM may support a transactional watch mechanism allowing client processes to indicate registry elements of interest (including, but not limited to, session information), and to receive notifications when any of the registered elements are changed.

In some embodiments, a distributed lock system (service) may include a distributed state manager that coordinates access to a registry of elements for which update notifications are requested. In response to a client request to set a watch on a particular data element or block (i.e., a watch establishment request specifying target elements of the registry for which update notifications are to be provided and an indication of a notification destination), the state manager may determine a watch establishment timestamp, and may initiate a sequence of asynchronous update notifications to the destination, each corresponding to an update to a target element that is completed after the watch was established. In some embodiments, the notifications may be provided in the order in which the corresponding updates were applied, and the sequence may include exactly one update notification for a given update. In some embodiments, the notifications provided to a particular client may exclude update notifications for elements of the registry other than any target elements specified by the client in a watch establishment request.

In some embodiments, distributed applications may use a distributed state manager for managing metadata that is read fairly frequently and is updated less frequently. For example, in the distributed lock systems described herein, a DSM may be used to manage session information (e.g., information indicating when sessions are created or revoked, which may change infrequently), but may not be used to manage lock information (e.g., information indicating whether a lock is held on an lockable item and/or by whom, which may change more frequently).

In some embodiments, the DSM may provide support for efficient transactional watch mechanisms that may alleviate the need for expensive polling operations. For example, clients may establish watches by specifying a set of registry elements of interest (e.g., as one or more paths to session information elements or other data elements to be watched), and a notification destination, such as a watch or a queue. Once a watch is established, the DSM may ensure that notifications for all subsequent updates are provided to the client that requested the watch (and/or to other interested clients), until the client decides to stop or terminate the watch. In some embodiments, the watch mechanism may provide at least four invariants: (a) validity (b) monotonicity (c) uniqueness and (d) selectivity. The validity invariant may imply that no updates are lost, even if a given DSM node crashes or connectivity to a given node is lost from the client, as long as the client can connect to at least one DSM server successfully. The monotonicity invariant may indicate that notifications for all updates are provided to the client in the order in which the updates occurred (e.g., in the order of the DSM logical timestamp associated with the updates). The uniqueness invariant may imply that there are no duplicate update notifications (i.e., that one and only one update is sent to the client for each update). The selectivity invariant may imply that updates for only those registry paths specified by the client are provided.

Client processes may specify the set of registry elements of interest using filter constructs, in some embodiments, where a given filter may specify one or more registry paths, and one or more filters may be applied to a given watch. Clients may specify any of several types of supported notification destinations for the watch updates in different embodiments, e.g., as executable handler threads to which notifications are passed, or as queues into which notification objects are placed. In at least some embodiments, a client may be able to choose whether to (a) include a watch establishment request in a transaction submitted to the DSM, where the transaction includes one or more read or write operations other than the watch establishment request itself or (b) submit the watch establishment request independently of any other reads/writes. In the case in which the watch establishment request is submitted as part of a transaction, the DSM may use the transaction processing techniques described herein (e.g., which may include a consensus-based protocol) to determine a commit timestamp of the transaction (the time at which the transaction is committed, which may be expressed in terms of a staleness indicator), and set the watch establishment time to the commit time of the transaction. In the case where a watch establishment request is submitted separately from any other read/write operation, the DSM may in some implementations generate a transaction comprising one or more operations involved in establishment of the watch (such as an instantiation of an executable thread or threads responsible for transmitting updates to the client), and set the watch establishment time to the commit time of the internally-generated transaction. In other implementations, the establishment time of the watch may be determined by the DSM based on other factors.

Once a watch establishment time has been determined for the watch requested, the DSM may ensure that notifications for any registry updates with commit times at or after the watch establishment time are transmitted to the client in accordance with the invariants discussed above, until the client explicitly removes the watch, or the client exits. A number of APIs associated with setting up and using the watch mechanism may be implemented in various embodiments, and may be exposed to the clients via client library components of the DSM. Once a watch is established, either as part of a transaction or independently, the destination specified by the client process may start receiving update notifications from the DSM. In at least some embodiments, for each registry element updated, the DSM may provide any combination of several values: e.g., the new value of the element, the old value of the element, the DSM timestamp indicating the commit time of the update, and/or the DSM timestamp of the DSM node (i.e., the value of a local registry logical timestamp at the node that is providing the update). In some embodiments, one or more of these values (e.g., the old value of the element, or the DSM timestamp of the DSM node) may not be included in an update notification.

In some embodiments, in addition to providing transactional watch mechanisms for session information, a DSM may be configured to provide failure detection, e.g., by executing a heartbeat protocol. In a heartbeat protocol, the client may send a heartbeat message to a server node of the DSM periodically (e.g., once every second) and the server node may respond to that heartbeat message. If the server node does not receive a heartbeat message when it is expected, it may assume that all connections between the client and the DSM have been lost and that the corresponding sessions are revoked. In some embodiments, in response to such a determination, the DSM may update the session information managed by the DSM. If watches have been placed on this session information, the DSM may notify other interested clients that the session information for those sessions should be updated to indicate the revocation of the sessions or should be deleted. Note that in some embodiments, the heartbeat protocol may be a simple request-reply protocol that is wait-free, and the client (requestor) may not need to wait for a heartbeat response. In such embodiments, the heartbeat response can arrive at any time, and the client would need to reconcile the arrival of the heartbeat response with information it has obtained through other means in order to determine the staleness of any particular data element on the client.

In some embodiments, the heartbeat protocol is executed independently from a protocol that effects and propagates transactions in the system. In such embodiments, these distributed lock systems may employ a separate transaction protocol that is implemented as another simple wait-free request-reply protocol. In one example of a transaction protocol, the client may sends a transaction request to the server, and the server sends back a transaction response that indicates the transaction results and outcome as soon as it can. The server may also send a stream of update messages to the client, and these update messages may include notifications for the client about various changes happening inside the server. In such systems, the transaction responses and update messages may provide the client with information about changes to the data that the client has received and/or changes to shared state in the collective (e.g., session information and/or other data elements on which transactional watches have been set).

Figure 8:
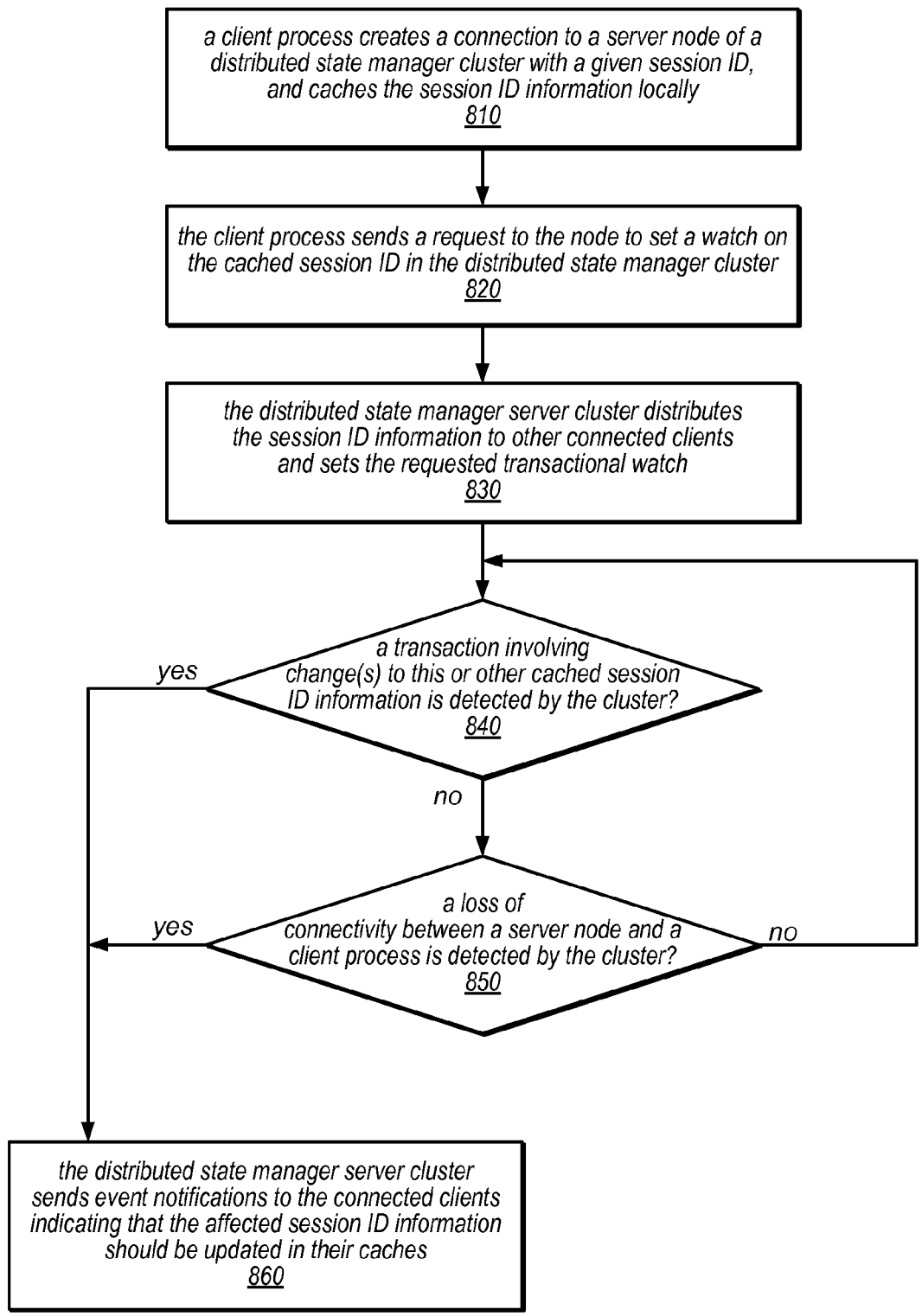
FIG. 8 is a flow diagram illustrating a method for setting and using a transactional watch on session information, according to one embodiment.

One embodiment of a method for setting and using a transactional watch on session information is illustrated by the flow diagram in FIG. 8. As illustrated at 810, in this example, the method may include a client process creating a connection to a server node of a distributed state manager cluster with a given session ID, and caching the session ID information (including corresponding staleness information) locally. In different embodiments, the session identifier may be assigned by the client process and provided to the distributed state manage when the session is registered, or may be assigned by the distributed state manager and returned to the client process. In some embodiments, the method may include the client process sending a request to the server node of the distributed state manager cluster to set a transactional watch on the session ID information, as in 820. In some embodiments, the method may also include the distributed state manager server cluster distributing the session ID information (including the corresponding staleness information) to other connected clients and setting the requested transactional watch, as in 830.

As illustrated in this example, once the transactional watch has been set, if a transaction involving change(s) to this or other cached session ID information is detected by the distributed state manager cluster (shown as the positive exit from 840), the method may include the distributed state manager server cluster sending one or more event notifications to the connected clients indicating that the affected session ID information should be updated in their caches, as in 860. Alternatively, if a loss of connectivity between a server node and a client process is detected by the cluster (shown as the positive exit from 850), the method may include the distributed state manager server cluster sending one or more event notifications to the connected clients indicating that the affected session ID information should be updated in their caches, as in 860. In this example, there may be no changes to session ID information that is cached in the system until or unless one of these conditions or events is detected (e.g., by the distributed state manager cluster or another component of the system).

Figure 9:
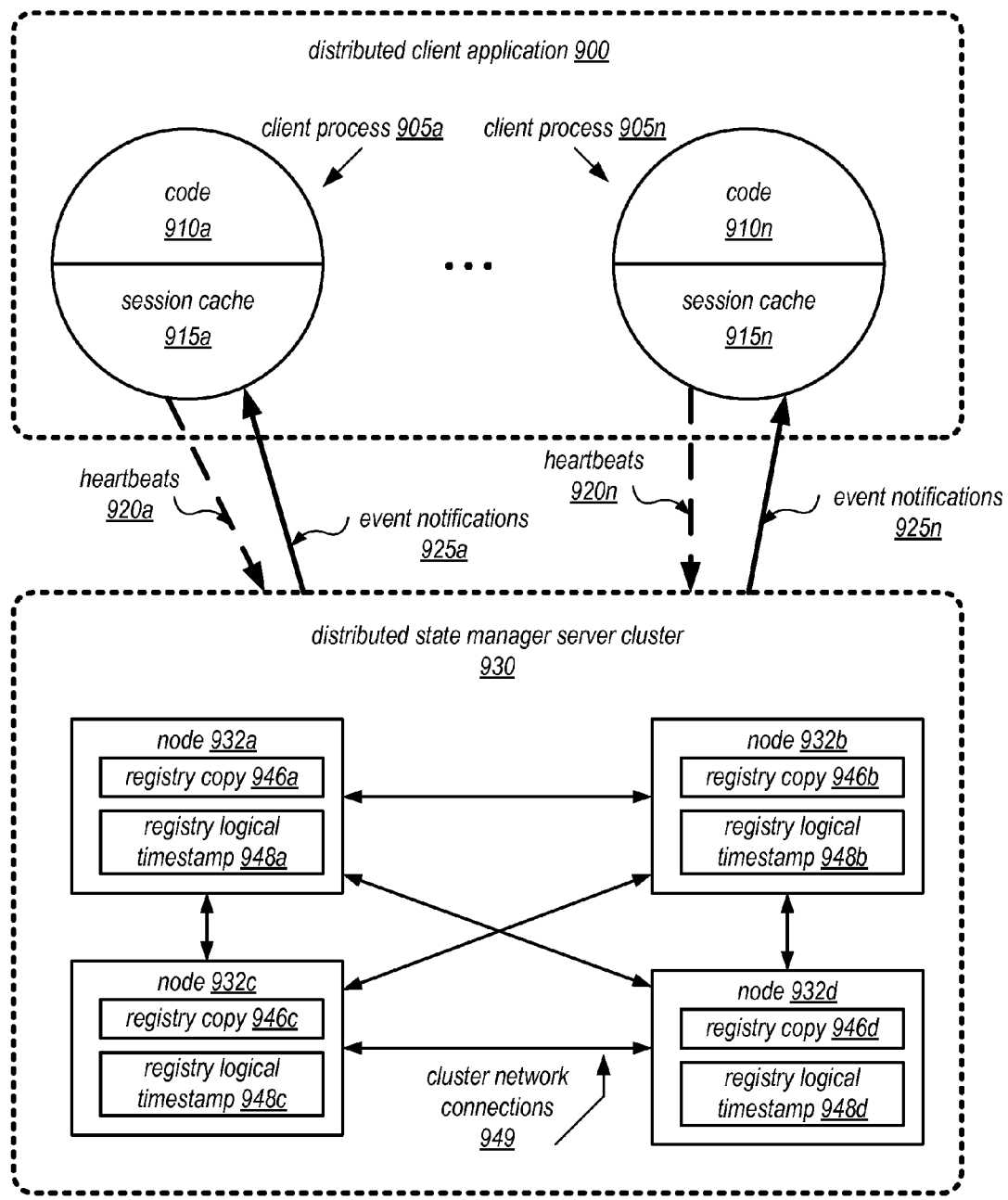
FIG. 9 is a block diagram illustrating the use of a distributed state manager to manage session information, according to one embodiment.

FIG. 9 illustrates various components of distributed state manager (DSM), according to at least some embodiments, and a distributed client application 900. In the illustrated embodiment, the DSM includes a server cluster 930, which includes a plurality of nodes 932 (e.g., 932a-932d). In this example, distributed client application 900 may comprise any program, or part of a program, that is configured to use the DSM for management of application state. As illustrated in this example, a distributed client application 900 may include multiple client processes 905 (e.g., 905a-905n), each of which may represent one or more threads of execution of the distributed client application 900. In one example, client processes 905 may represent respective nodes of a distributed storage service application that is configured to receive customer requests over a network and in response, perform various functions on behalf of those customers. In another example, client processes 905 may represent respective nodes of a distributed inventory management application that is configured to access various data items and/or process various work items in order to keep inventory records up-to-date. In the example illustrated in FIG. 9, client process 905a may execute code 910a (which may include user code and/or one or more client library components), and may maintain session information in session cache 915a, and client process 905n may execute code 910n (which may include user code and/or one or more client library components), and may maintain session information in session cache 915n. In various embodiments, different client processes may execute different user code and/or various library components. For example, in some embodiments, a client library component of the DSM may include a software library that exposes one or more programmatic interfaces to user code 910 for interacting with the DSM server cluster 930. In such embodiments, user code 910 of a client process 905a may invoke various methods of the client library component in order to interact with the DSM server cluster 930 over a network, access different constants and/or variables of client library components, and/or otherwise access data and functionality of the client library components. In some embodiments, the client library components may read data from the DSM, update data in the DSM, and/or listen for events notifications (e.g., event notifications 925a-925n) from the DSM.

According to the illustrated embodiment, a client process 905 may communicate with DSM server cluster 930 to, for example, submit requests to establish and use transactional watch mechanisms (e.g., to set transactional watches on data stored in its session cache 915), or to set up and receive notifications for session caches 915. In some embodiments, each node 932 of the DSM server cluster 930 may be implemented using a different physical and/or virtual machine. In other embodiments, two or more of nodes 932 may be different software instances or processes executing on the same physical or virtual machine. The set of server nodes 932 may sometimes be referred to herein as a "collective".

In the example illustrated in FIG. 9, a given client process 905 may communicate with the collective via one of the nodes 932, and different client processes may communicate with different nodes. In various embodiments, the particular node 932 chosen by a client process 905 may depend on the identity of the client, the type of request, and/or other factors. In some embodiments, a client process 905 may maintain affinity to a given node 932 once communication and/or another relationship has been established. It may also be possible for a client process 905 that has established affinity with a first node 932 of the DSM collective to switch to another node at any time. This may be done arbitrarily, in response to a node failure, in response to the node becoming overloaded, in response to a scheduler component indicating that the client should switch to another node, and/or in response to various other events. As illustrated in this example, the various nodes 932 may communicate with one another via network connections 949. These network connections may be implemented using various types of networks (e.g., Myrinet, Ethernet, Gigabit Ethernet, etc.) in various topologies (e.g., ring, grid, Torus, bus, etc.). For simplicity of explanation, FIG. 9 illustrates a DSM implemented on a fully-connected cluster of computers in which each node 932 is a different physical machine in the cluster, executes a separate instance of the DSM node software, and can communicate directly with every other node 932 in the collective via a network connection. However, those skilled in the art will appreciate that various other configurations are possible using different physical and/or virtual machines, connected by different network types and/or topologies, as described above.

In the example illustrates in FIG. 9, nodes 932 of the collective may work together to maintain a shared state, e.g., for various client applications, in a logical registry. The logical registry may not necessarily be implemented as a separate physical entity, but rather, as a logical entity that may be implemented across multiple nodes 932 of the DSM. For example, in the depicted embodiment, each node 932 may keep a respective local registry copy 946 (illustrated in FIG. 9 as registry copies 946a-946d). Through a consensus protocol, the nodes 932 may agree on state transitions for each node to apply to its local registry copy, thereby collectively maintaining a single logical registry. Each node 932 may thus maintain a cached copy of the registry that is valid as of the last registry transition (i.e., update) known at the node. In some embodiments, each transition may be associated with a registry logical timestamp or other indicator of data staleness, such as in a monotonically increasing 64-bit integer or counter agreed upon by the collective DSM server cluster 930. This timestamp may be a physical or logical time in different embodiments, and may be referred to as a "staleness indicator" in the descriptions herein. In embodiments in which such a staleness indicator is maintained as a counter, it may be incremented each time the registry is updated, e.g., each change to the logical registry may result in a change to the staleness indicator, and each change in the staleness indicator may indicate that at least one element of the registry was updated. In some embodiments, each node 932 may maintain its own registry logical timestamp 948 (illustrated in FIG. 9 as registry logical timestamps 948-948d), indicative of the most recent transition of the logical registry that is reflected in the local registry copy at that node. At any point in time, the value of the local logical registry timestamp 948 at a given node 932 may differ from the value of the local logical registry timestamp of another node; however, if and when two nodes have the same local logical registry timestamp values, the data in their respective local registry copies 946 may be identical (i.e., both local copies of the registry may be guaranteed to have applied the same set of updates). In at least some embodiments, each node 932 may also maintain an independent system clock that is separate from the registry logical timestamps.

In some embodiments, the logical registry maintained by a distributed state manager server cluster may include information that may be accessed in a consistent manner by a plurality of the nodes 932. In some embodiments, the logical registry may include entries storing various types of data elements and/or associated metadata, including, but not limited to, session objects that represent connections to client processes 905. In some embodiments, the DSM may maintain multiple logical registries. For example, different distributed applications may use respective logical registries separate from one another to maintain state for the applications. In other embodiments, a single logical registry may include elements representing state information of a plurality of client applications. In some embodiments, each of the elements of a given registry may be identified by a respective pathname within a namespace, e.g., each element may be identified via a string concatenated from substrings, where each substring represents a respective hierarchical component named using a directory-like naming convention.

The data entries in the logical registry may each be identified with a respective path. In various embodiments, these data entries may include information stored to the logical registry by client processes, such as information to be shared with other client processes. In some embodiments, each of the data entries may include a name, a value, a creation time, and/or a modification time. The time-related information stored in the registry (such as creation time, or modification time) may be expressed in terms of a corresponding value of a staleness indicator, as described herein, and/or using a system clock time in different embodiments. In some embodiments, a logical registry may list named client processes and/or client sessions (e.g., representations of connections between client processes 905 and the server cluster 930) recognized by the DSM. Such listings may also include configuration parameters for those client processes and/or sessions. For example, in some embodiments, a named client process or session may be alternatively listed as either registered, revoked, or forgotten.

The DSM server cluster 930 may act as a mediator between client processes 905 and one or more logical registries implemented by the collective. For example, a client process 905 may interact with a logical registry by submitting transactions to the DSM server cluster 930, which may interact with the logical registry on behalf of the client process. Through a read transaction, a client process may read information about sessions from the logical registry. Using a write transaction, a client process 905 may update information in the logical registry. Each transaction may have different possible outcomes. In some embodiments, these outcomes may correspond to success-write, success-read, abort, and fail. A success-write outcome may indicate that a transaction that includes at least one write operation was executed successfully, any checks included in the transaction passed, and the registry has been updated. A success-read outcome may indicate that the transaction executed successfully but did not make any changes to the logical registry. An abort outcome may indicate that the transaction was aborted for some reason other than the particular contents of the transaction. In various embodiments, the DSM may abort and/or reattempt a transaction for different reasons. A fail outcome may indicate that the transaction failed, for example, because one or more checks in the transaction failed, a lock creation failed because the lock already exists, the request contained a syntax error, and/or for various other reasons.

The DSM may determine the outcome of various transactions and route event notifications (e.g., as indicated by the arrows labeled 925a and 925n in FIG. 9) indicating the outcomes to interested client processes 905. Client processes 905 may register to receive some or all events in some events in some embodiments, e.g., using the transactional watch mechanism described herein, or a similar transactional watch mechanism. In some embodiments, the DSM may be configured to forward all event notifications to every client by default, but to allow each client to set up various filters to indicate the types of events in which it is interested. In some embodiments, each event notification 925 may be labeled with a physical and/or logical timestamp (e.g., a staleness indicator value, such as those described herein) from which the client process 925 may be able to infer bounds on the age of the event.

As indicated above, in some embodiments client processes 905 may use transactions to read, insert, remove, and/or modify data stored in the logical registry implemented by the collective. In some embodiments, a transaction may be specified using a stack-based language. Such a transaction may be specified in terms of data tokens and operations, where the data tokens are pushed directly onto a stack and the operations read their inputs from the stack and push results to the stack. After such a transaction is complete, the resulting stack may be sent to the client process.

In some embodiments, the DSM may execute a failure detection service to detect failures on or among different nodes 932. For example, a failure detection service may be configured to detect when (or determine whether) a given node 932 has crashed or has become otherwise unresponsive. In some embodiments, a failure detection service may be executed across the server cluster 930 in a distributed manner. In some embodiments, the failure detection service may also determine whether particular client processes 905 have become unresponsive, for example, by monitoring heartbeat messages 920 (such as heartbeats 920a and 920n illustrated in FIG. 9) from various client processes 905. In at least some embodiments, if connectivity is lost between a client process 905 and a given DSM node 932, the client library component of the client process may be configured to automatically attempt to establish a connection to a different node 932. In at least some implementations, the client process may not be aware of the identity of the node to which it is connected.

While various examples of systems for implementing a distributed lock system that includes a distributed state manager and an external lock information database are described herein, many alternate embodiments may be contemplated. For example, in one embodiment, work items that represent tasks (or groups of tasks) to be performed may be placed in a work queue and a sweeper process may access that queue to determine if any work items were locked during sessions for which the session ID is now invalid (e.g., due to a node failure or session revocation). The sweeper process may notify a worker that such a work item appears to be available to be worked on, and the worker may then attempt to obtain a lock on the work item in the a manner similar to that described herein. In other embodiments, workers may query the database for work items that need to be worked on (e.g., work items for which the session ID field is empty or for which the session identified in the session ID field is no longer active), and may attempt to obtain the corresponding lock(s) in order to work on them.

In some embodiments, rather than caching session information at each compute node on which a locking entity (client process) executes, each client process that needs to examine the session information to determine whether a session identified in a record in the lock information database is likely to be live or is known to have been revoked may access the distributed state manager directly. In some embodiments, read operations targeting the session information maintained by the distributed state manager may be guaranteed to be consistent. However, this may slow the system down in embodiments in which session and/or server failures are common and such checks need to be performed frequently. In another embodiment, a failure detector or distributed state manager that manages session information may not need to have high write throughput. In other words, the system may not need to cache session information the failure if the failure detector or distributed state manager supports a high read throughput for checking session information. However, the system may still need a way to determine how stale the session data (e.g., using timestamps, transaction identifiers, or any type of staleness indicator that allows the system to determine when a session is known to be revoked) to ensure consistency.

The methods described herein may in various embodiments be implemented by any combination of hardware and software. For example, in one embodiment, the methods may be implemented by a computer system that includes a processor executing program instructions stored on a non-transitory computer-readable storage medium coupled to the processor. The program instructions may be configured to implement the functionality described herein (e.g., the functionality of various servers and other components that implement the distributed lock services described herein). For example, in some embodiments, program instructions that are executable to implement an application that includes one or more operations to obtain a lock on an item may include program instructions that are executable to perform establishing a connection (and therefore a session) with a distributed state manager server cluster, requesting that a transactional lock be placed on session information and/or metadata, attempting to obtain a lock, and/or releasing a lock. In other embodiments, program instructions executable to perform these functions may be included in a client library as functions or methods that may be invoked by the locking application, or an API of the distributed state manager server cluster and/or the lock information database may be exposed to the locking application in order to invoke this functionality.

Figure 10:
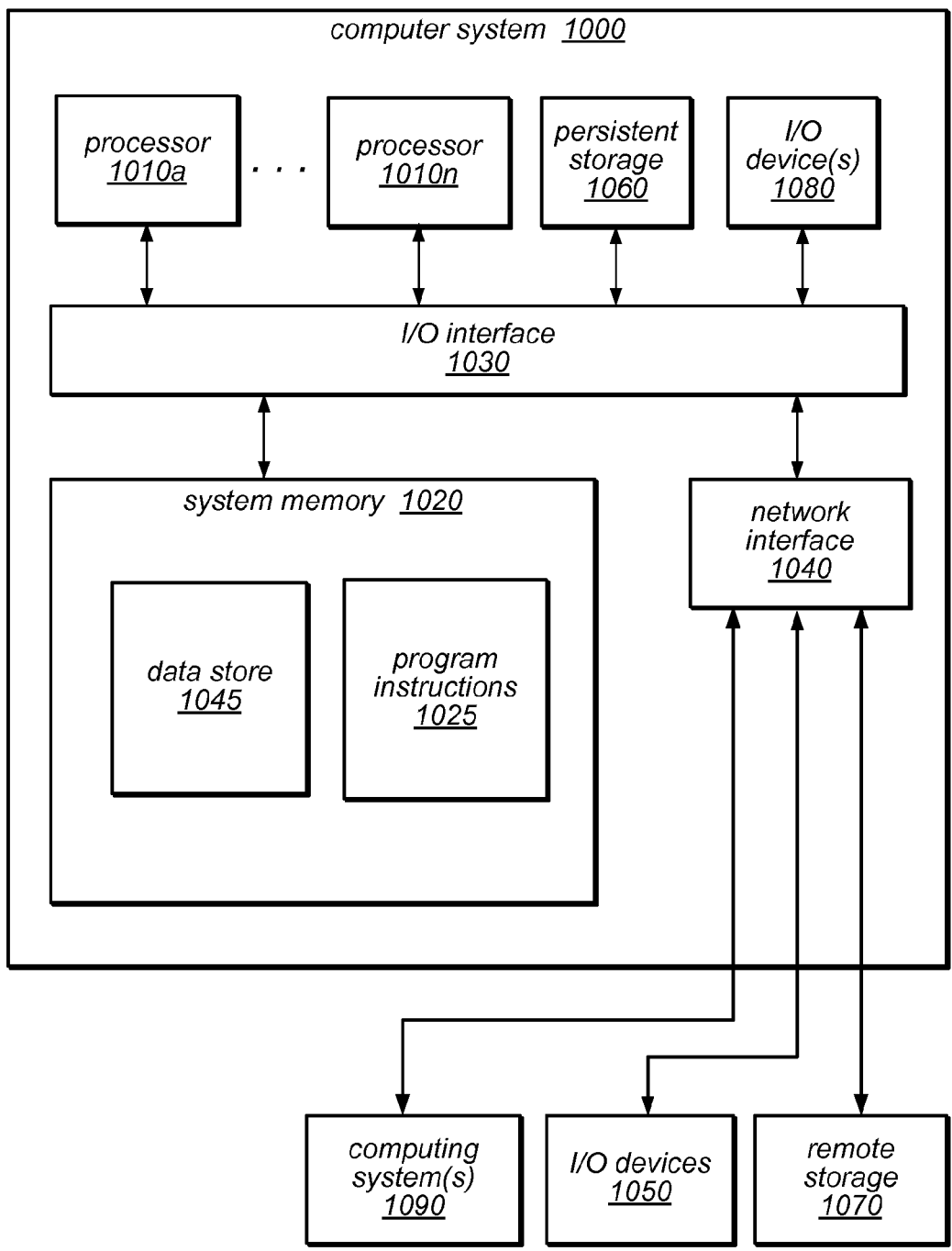
FIG. 10 is a block diagram illustrating a computer system configured to implement at least a portion of a system that manages lock and session information, according to various embodiments.

FIG. 10 is a block diagram illustrating a computer system configured to implement at least a portion of a system (or a distributed lock service thereof) that manages lock and session information using a distributed state manager and an external lock information database, according to various embodiments. For example, computer system 1000 may be configured to implement a node of a distributed state manager server cluster, a compute server (or compute node) on which a distributed application is executing, a high throughput lock information database, or any other component of the systems described herein. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement a distributed lock system or service. In another example, an instance of a server application executing on computer system 1000 may use network interface 1040 to communicate with other instances of the server application that may be implemented on other computer systems.

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed.

Computer system 1000 includes one or more system memories 1020 that are configured to store instructions and data accessible by processor 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a node of a distributed state manager server cluster, a compute server (or compute node) on which a distributed application is executing, a high throughput lock information database, or any other component of the systems described herein. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the distributed lock service or clients thereof (e.g., on a node of a distributed state manager cluster, on a node that implements a high throughput lock information database, or a compute node), such as session information, information stored in various lock data entries of a database table, information stored in logical registries, lockable data items or references to shared resources, software counters, timestamp values, or other information used in performing the methods described herein may be stored in data store 1045 or in another portion of system memory 1020 on one or more nodes, in persistent storage 1060, and/or on one or more remote storage devices 1070, in various embodiments. In some embodiments, and at various times, system memory 1020 (e.g., data store 1045 within system memory 1020), persistent storage 1060, and/or remote storage 1070 may store primary copies of various data elements or blocks (e.g., database tables or records thereof), secondary copies (i.e., replicas) of various data elements or blocks, backup copies of various data elements or blocks, metadata associated with various data elements or blocks and/or their state, logical registry configuration information, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more nodes of a distributed state manager server cluster, a compute server on which a distributed application is executing, a high throughput lock information database, or any other component of the systems described herein and/or clients of the distributed lock system or service described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 10 (e.g., hardware clocks, displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more web services. For example, distributed state manager server nodes and/or compute nodes within a distributed system may present lock services and/or database services to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The invention claimed is:

1. A system, comprising:
    one or more computing nodes on which a client application is executing, each of the computing nodes comprising at least one processor and a memory;
    a distributed state manager cluster comprising two or more server nodes that are separate and distinct from the one or more computing nodes, the distributed state manager cluster comprising at least one processor and a memory; and
    a database executing on a computing node that is separate and distinct from the computing nodes on which the client application is executing and the two or more server nodes of the distributed state manager cluster;
    wherein the distributed state manager cluster is configured to:
        store session information about sessions that have been established in the system between client applications and the distributed state manager cluster, and metadata indicating staleness of the session information;
        detect changes in the session information or metadata; and
        distribute update notifications for the session information or metadata to the one or more computing nodes on which the client application is executing in response to detecting changes in the session information or metadata;
    wherein the one or more computing nodes on which the client application is executing are configured to:
        cache session information and metadata indicating staleness of the cached metadata; and
        update the cached session information or metadata in response to update notifications received from the distributed state manager cluster;
    wherein the database is configured to store lock information for a plurality of items that are lockable by the client application in respective entries; and
    wherein the client application is configured to initiate an operation to obtain a lock on one of the plurality of items, wherein to initiate the operation to obtain the lock, the client application is configured to:
        determine whether the database comprises a database entry for the one of the plurality of items indicating that the one of the plurality of items has been locked;
        in response to determining that the database does not comprise a database entry for the one of the plurality of items, perform an operation to attempt to obtain the lock for the one of the plurality of items;
        in response to determining that the database comprises a database entry for the one of the plurality of items indicating that the one of the plurality of items has been locked, determine, based at least in part on the cached session information, whether a particular session during which the one of the plurality of items was locked is likely to be live or is known to have been revoked; and
        in response to determining that the particular session during which the one of the plurality of items was locked is likely to be live, abandon the operation to obtain the lock.

2. The system of claim 1,
    wherein the database entry for the one of the plurality of items comprises a value identifying the particular session during which the one of plurality of items was locked and a staleness indicator value; and
    wherein to determine whether the particular session is likely to be live or is known to have been revoked, the client application is configured to compare the staleness indicator value in the database entry for the one of the plurality of items with one or more staleness indicator values in the cached metadata.

3. The system of claim 1,
    wherein prior to initiating the operation to obtain a lock on the one of the plurality of items, the client application is configured to establish a session representing a connection between the client application and the distributed state manager cluster; and
    wherein to attempt to obtain the lock for the one of the plurality of items, the client application is configured to attempt to write an identifier of the session established by the client application and a staleness indicator value for the identifier of the session established by the client application in the database entry for the one of the plurality of items.

4. The system of claim 1,
    wherein the distributed state manager cluster is configured to set a transactional watch on the session information or metadata; and
    wherein to detect changes in the session information or metadata, the distributed state manager cluster is configured to detect updates to the session information or metadata made by transactions that target the session information or metadata.

5. A method, comprising:
    performing by an entity executing on one or more computers:
        accessing a database that stores a plurality of lock data entries, wherein each lock data entry is configured to store lock data for a respective item, and wherein each lock data entry comprises an identifier of the respective item and session information for the respective item;
        determining that the database stores a lock data entry for a particular item;
        in response to determining that the database stores the lock data entry for the particular item, determining, based at least in part on the session information in the lock data entry, whether the particular item has been locked, wherein the session information in the lock data entry comprises an identifier of a session during which the particular item was locked;
        in response to determining that the particular item has been locked, determining, based at least in part on session information that is obtained from a distributed state manager cluster that is separate and distinct from both the database and the entity, whether a session during which the particular item was locked has been revoked, wherein the session information that is obtained from the distributed state manager cluster comprises a respective session identifier for each of a plurality of sessions established between entities that lock items and the distributed state manager cluster; and in response to determining that the session during which the particular item was locked has been revoked, performing an operation to attempt to obtain a lock on the particular item, wherein said determining whether a session during which the particular item was locked has been revoked comprises determining whether the session information that is obtained from the distributed state manager cluster comprises a session identifier matching the session identifier in the session information in the lock data entry.

6. The method of claim 5, wherein said performing an operation to attempt to obtain the lock on the particular item comprises attempting to update the session information in the lock data entry for the particular item using an atomic compare-and-swap type operation.

7. The method of claim 6, further comprising:
in response to said attempting to update the session information in the lock data entry being unsuccessful, abandoning the operation to attempt to obtain the lock on the particular item.

8. The method of claim 5,
wherein the session information that is obtained from the distributed state manager cluster further comprises:
a respective staleness indicator value for each of the plurality of session identifiers;
wherein the lock data entry for the particular item further comprises a staleness indicator value; and
wherein said determining that a session during which the particular item was locked has been revoked comprises:
comparing the staleness indicator value in the lock data entry with one or more of the staleness indicator values obtained from the distributed state manager cluster; and
determining, based at least in part on said comparing, that the session information that is obtained from the distributed state manager cluster is at least as up-to-date as the lock data entry.

9. The method of claim 8, wherein the staleness indicator value in the lock data entry comprises a timestamp value.

10. The method of claim 8, wherein the staleness indicator value in the lock data entry comprises an identifier of a transaction.

11. The method of claim 8, wherein said comparing comprises accessing the one or more of the staleness indicator values obtained from the distributed state manager cluster in a local cache of the entity.

12. The method of claim 5, further comprising:
accessing the database;
determining whether the database stores a lock data entry for a second item;
in response to determining that the database does not store a lock data entry for the second item, creating a lock data entry in the database for the second item comprising session information for a current session.

13. The method of claim 5, further comprising, in response to the attempt to obtain a lock on the particular item being successful, subsequently releasing the lock on the particular item, wherein said releasing comprises deleting the lock data entry from the database.

14. The method of claim 5, further comprising, in response to the attempt to obtain a lock on the particular item being successful, subsequently releasing the lock on the particular item, wherein said releasing comprises clearing the session information in the lock data entry.

15. The method of claim 14, further comprising, subsequent to said releasing, another entity executing on the one or more computers performing a second operation to attempt to obtain a lock on the particular item, wherein said performing a second operation comprises attempting to update the session information in the lock data entry to identify a current session during which the other entity is executing.

16. The method of claim 5, wherein the particular item represents a work item on which only one executing entity can work at a time.

17. A non-transitory computer-readable storage medium storing program instructions that when executed on one or more computers cause the one or more computers to implement an entity that performs:
establishing a connection between the entity and a distributed state manager cluster, wherein said establishing comprises registering a session identifier with the distributed state manager cluster;
requesting that the distributed state manager cluster set a transactional watch on the session identifier;
subsequent to said requesting:
receiving an update notification from the distributed state manager cluster in response to a change affecting a session identifier in the session information obtained from the distributed state manager cluster on which a transactional watch has been set; and
updating a local copy of at least a portion of the session information to reflect the change;
subsequent to said establishing and said requesting, accessing a database that stores a plurality of lock data entries, wherein each lock data entry is configured to store lock data for a respective item, and wherein each lock data entry comprises an identifier of the respective item and a session identifier field;
determining that the database stores a lock data entry for a particular item;
in response to determining that the database stores a lock data entry for the particular item, determining, based at least on part on a value of the session identifier field in the lock data entry, that the particular item has been locked;
in response to determining that the particular item has been locked, determining, based at least in part on session information that is obtained from the distributed state manager cluster that is separate and distinct from both the database and the entity, whether a session identified by the value of the session identifier field is likely to be live or is known to have been revoked; and
in response to determining that the session identified by the value of the session identifier field was locked is known to have been revoked, performing an operation to attempt to obtain a lock on the particular item.

18. The non-transitory computer-readable storage medium of claim 17, wherein when executed on the one or more computers, the program instructions cause the one or more computers to implement the entity that further performs:
subsequent to said requesting:
receiving an update notification from the distributed state manager cluster in response to the distributed state manager cluster detecting that a session has been revoked or that one of the one or more computers has failed; and updating a local copy of at least a portion of the session information to reflect said detecting.

19. A system, comprising:

one or more computing nodes, each comprising at least one processor and a memory;

a plurality of processes executing on the one or more computing nodes;

a failure detecting component configured to track session identifiers and staleness information for a plurality of sessions, wherein each of the plurality of sessions represents one of the processes executing on the one or more computing nodes;

a data structure configured to store lock state information for a plurality of items that are lockable by at least some of the plurality of processes;

wherein one of the plurality of processes is configured to determine that a lock is held on a particular item, wherein to determine that the lock is held on the particular item, the one of the plurality of processes is configured to:

access the data structure;

based on the access, determine that the data structure stores lock state information for the particular item;

in response to determining that the data structure stores lock state information for the particular item, wherein the lock state information includes an item session identifier that identifies a session and an item staleness indicator:

compare the item session identifier to a corresponding session identifier from the failure detecting component;

in response to the item session identifier matching the corresponding session identifier, determine that the session is likely to be live;

in response to the item session identifier failing to match the corresponding session identifier, compare the item staleness indicator to corresponding staleness information from the failure detecting component;

in response to the item staleness indicator being newer than the staleness information, determining that the session identified in the lock state information is likely to be live;

in response to the staleness information being newer than the item staleness indicator, determining that the session identified in the lock state information is not likely to be live;

in response to determining that the session identified in the lock state information for the particular item is likely to be live, refraining from attempting to obtain the lock on the particular item; and in response to determining that the session identified in the lock state information for the particular item is not likely to be live, attempting to obtain the lock on the particular item.

20. The system of claim 19, wherein the failure detecting component comprises a distributed state manager; and wherein the failure detecting component is further configured to detect a failure of one or more of the computing nodes or to detect a revocation of a session.

21. The system of claim 20, wherein to track the corresponding session identifier and the corresponding session information for the plurality of sessions, the distributed state manager is configured to set transactional watches on the corresponding session identifier and the corresponding session information; and wherein the distributed state manager is further configured to send event notifications in response to detecting changes in the corresponding session identifier and the corresponding session information using the transactional watches.

22. The system of claim 19, wherein the data structure guarantees atomicity and consistency for operations that target an entry in the data structure.

23. The system of claim 20, wherein the data structure supports a higher write throughput rate than the distributed state manager.

\* \* \* \* \*